AUGUST P. CORSE.
Improvement in Cooking Stoves.
No. 120,497. Patented Oct. 31, 1871.
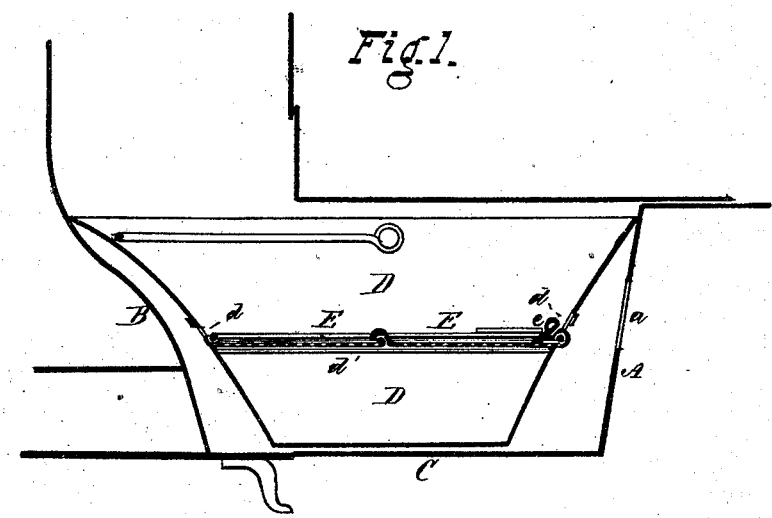
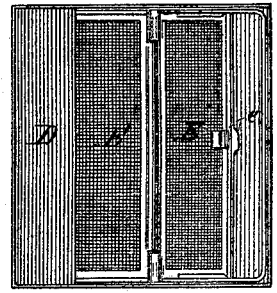
Witnesses.
Inventor.

120,497

UNITED STATES PATENT OFFICE.

AUGUSTUS P. CORSE, OF TROY, NEW YORK, ASSIGNOR TO EDDY, CORSE & CO. OF SAME PLACE.

IMPROVEMENT IN COOKING-STOVES.

Specification forming part of Letters Patent No. 120,497, dated October 31, 1871.

*To all whom it may concern:*

Be it known that I, AUGUSTUS P. CORSE, of Troy, in the county of Rensselaer and State of New York, have invented certain new and useful Improvements in Cooking-Stoves; and do hereby declare that the following is a full, clear, and exact description thereof, reference being had to the accompanying drawing making a part of this specification, in which—

Figure 1 is a vertical central section of the ash-pit and ash-pan of my stove on a line passing from front to rear. Fig. 2 is a plan view of the upper side of the ash-pan, and Fig. 3 is a top view of the ash-sifter shaker.

Letters of like name and kind refer to like parts in each of the figures.

The object of my invention is the separation, within the ash-pit of a stove, of the cinders and ashes that fall from the grate, so as to permit said cinders to be returned to the fuel-chamber and render necessary the removal of the ashes only from the stove; and to this end it consists, principally, in a grate resting within suitable bearings between the upper and lower sides of the ash-pan, and capable of a horizontally-reciprocating movement from front to rear, substantially as and for the purpose hereinafter specified. It consists, further, in a sifting-grate, arranged and operating as above described, and divided longitudinally into two sections, hinged together so as to permit one of the same to be raised, substantially as and for the purpose hereinafter shown.

In the annexed drawing, A represents the front, B the rear, and C the bottom plates of an ash-pit of usual form, within which is placed an ash-pan, D, the front and rear sides of which have, preferably, the upward and outward flaring form shown. Midway between the top and bottom of the ash-pan, and within each of its front and rear sides, is formed a narrow horizontal slot, d, which extends between the end plates and permits of the insertion therein of a grate, E, having a size sufficient to inclose the entire space between said sides and ends and divide the ash-pan vertically into two compartments. A narrow ledge, d', extends horizontally inward from and across each end plate on a line with the lower edge of the openings, and furnishes a bearing for the grate, so as to permit the latter to be moved back and forth upon said bearing and through said openings. A shaker-iron, F, provided upon one end with a hook, f, which, passing inward through an opening, a, in the front plate A, fits into an ear, e, attached to the front edge and upper side of said grate, permits the latter to be moved to and fro, as described.

As thus arranged it will be seen that by shaking the grate the cinders and ashes falling from the fuel-chamber and resting upon said grate will be so thoroughly agitated as to cause said ashes to fall through into the lower compartment and leave the cinders, which may then be removed with a shovel and returned to the fire.

When it is desired to remove ashes from the pan the grate is drawn forward sufficiently to leave a suitable space between its rear edge and the corresponding side of the pan, and the latter then tilted to the rear.

For greater convenience in the removal of ashes from the pan the grate may be divided longitudinally and the sections hinged together so as to permit the rear one to be raised whenever said grate is drawn forward sufficiently to release its rear end from the slot in the corresponding side of the pan.

Suitable stops secured upon the grate to prevent the same from being drawn too far forward, and other stops or guides attached to the ends of the pan immediately above said grate for the purpose of insuring the vertical position of the latter, complete the device, the operation of which has hereinbefore been sufficiently illustrated.

The advantages possessed by this device are, that by its use the usually disagreeable operation of separating cinders from ashes so as to enable the former to be returned to the fuel-chamber is relieved from all its unpleasant features and rendered no more uncleanly either to the room or to the person of the operator than the supplying of fuel to the stove.

Having thus fully set forth the nature and merits of my invention, what I claim as new is—

1. A grate, E, resting within or upon suitable bearings between the upper and lower sides of an ash-pan, D, and capable of a horizontally-reciprocating movement from front to rear, substantially as and for the purpose specified.

2. A sifting-grate, formed of two longitudinal sections hinged together and resting within or upon suitable bearings between the upper and lower sides of an ash-pit so as to be capable of a horizontally-reciprocating movement from front to rear, substantially as and for the purpose shown.

In testimony that I claim the foregoing I have hereunto set my hand this 22d day of August, 1871.

AUGUSTUS P. CORSE.

Witnesses:
W. P. ALLENDORPH,
C. H. McGRATH. (154)